United States Patent
Fischer et al.

(10) Patent No.: US 10,710,543 B2
(45) Date of Patent: Jul. 14, 2020

(54) CENTRAL PASSENGER AIR BAG

(71) Applicant: TRW Vehicle Safety Systems Inc., Washington, MI (US)

(72) Inventors: Kurt F. Fischer, Rochester, MI (US); Douglas M. Gould, Lake Orion, MI (US); Alexandra E. Schroeder, Lenox, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 112 days.

(21) Appl. No.: 15/908,855

(22) Filed: Mar. 1, 2018

(65) Prior Publication Data
US 2018/0251096 A1 Sep. 6, 2018

Related U.S. Application Data

(60) Provisional application No. 62/465,187, filed on Mar. 1, 2017.

(51) Int. Cl.
*B60R 21/233* (2006.01)
*B60R 21/205* (2011.01)
(Continued)

(52) U.S. Cl.
CPC .......... *B60R 21/233* (2013.01); *B60R 21/203* (2013.01); *B60R 21/205* (2013.01);
(Continued)

(58) Field of Classification Search
CPC .... B60R 2021/0009; B60R 2021/0023; B60R 2021/23107; B60R 2021/0048;
(Continued)

(56) References Cited

U.S. PATENT DOCUMENTS 5,031,929 A * 7/1991 Henseler ............... B60R 21/231
280/730.1
8,882,138 B1 * 11/2014 Hicken ................. B60R 21/231
280/730.1
(Continued)

FOREIGN PATENT DOCUMENTS

JP 2015120382 A * 7/2015

*Primary Examiner* — Laura Freedman
(74) *Attorney, Agent, or Firm* — Tarolli, Sundheim, Covell & Tummino LLP

(57) ABSTRACT

A vehicle occupant safety system helps protect front seat occupants of a vehicle in the event of a collision that results in oblique forward occupant movement. The safety system includes a frontal air bag inflatable between on instrument panel end the front seat vehicle occupant, and a central air bag inflatable adjacent and inboard of the frontal air bag. The frontal air bag can be configured and positioned to receive and cushion the vehicle occupant moving in an oblique direction in the vehicle as the result of a vehicle collision. The central air bag can be configured and positioned to support an inboard portion of the frontal airbag against flattening out in response to receiving the obliquely moving occupant, and to engage the obliquely moving occupant's head and resist rotation of the vehicle occupant's head resulting from moving obliquely into engagement with the frontal air bag.

20 Claims, 4 Drawing Sheets

(51) Int. Cl.
  *B60R 21/203* (2006.01)
  *B60R 21/00* (2006.01)
(52) U.S. Cl.
  CPC ............ *B60R 2021/0009* (2013.01); *B60R 2021/0048* (2013.01)
(58) Field of Classification Search
  CPC ........ B60R 2021/23161; B60R 21/203; B60R 21/205; B60R 21/233
  See application file for complete search history.

(56) References Cited

U.S. PATENT DOCUMENTS

| | | | |
|---|---|---|---|
| 9,150,186 B1* | 10/2015 | Belwafa | B60R 21/233 |
| 9,162,645 B2* | 10/2015 | Cho | B60R 21/205 |
| 9,227,587 B1* | 1/2016 | Belwafa | B60R 21/205 |
| 9,248,799 B2* | 2/2016 | Schneider | B60R 21/205 |
| 9,272,684 B1* | 3/2016 | Keyser | B60R 21/237 |
| 9,358,945 B2* | 6/2016 | Yamada | B60R 21/233 |
| 9,505,372 B2* | 11/2016 | Yamada | B60R 21/2338 |
| 9,566,929 B1* | 2/2017 | Belwafa | B60R 21/205 |
| 9,676,355 B2* | 6/2017 | Kruse | B60R 21/0136 |
| 9,731,677 B1* | 8/2017 | Belwafa | B60R 21/233 |
| 9,758,121 B2* | 9/2017 | Paxton | B60R 21/205 |
| 9,758,123 B2* | 9/2017 | Yamada | B60R 21/2338 |
| 10,023,144 B2* | 7/2018 | Taguchi | B60R 21/205 |
| 2005/0184489 A1* | 8/2005 | Kobayashi | B60R 21/231 280/729 |
| 2014/0239619 A1 | 8/2014 | Fukawatase et al. | |
| 2014/0361521 A1 | 12/2014 | Fukawatase et al. | |
| 2014/0375033 A1 | 12/2014 | Fukawatase et al. | |
| 2015/0115581 A1 | 4/2015 | Mazanek et al. | |
| 2015/0166002 A1 | 6/2015 | Fukawatase | |
| 2015/0175110 A1 | 6/2015 | Kalandek et al. | |
| 2015/0197210 A1 | 7/2015 | Abe | |
| 2015/0307055 A1 | 10/2015 | Cheng et al. | |
| 2015/0307802 A1 | 12/2015 | Fukawatase et al. | |
| 2016/0009242 A1 | 1/2016 | Fukawatase | |
| 2016/0023525 A1 | 1/2016 | Hiruta et al. | |
| 2016/0039385 A1 | 2/2016 | Watamori et al. | |
| 2016/0059817 A1 | 3/2016 | Umehara et al. | |
| 2016/0107601 A1 | 4/2016 | Suk | |
| 2016/0107602 A1 | 4/2016 | Nakashima | |
| 2016/0159311 A1 | 6/2016 | Yamada et al. | |
| 2016/0159312 A1 | 6/2016 | Sato et al. | |
| 2016/0297393 A1 | 10/2016 | Fukawatase et al. | |
| 2016/0311392 A1 | 10/2016 | Jindal et al. | |
| 2017/0008475 A1 | 1/2017 | Kruse | |
| 2017/0015266 A1 | 1/2017 | El-Jawahri et al. | |
| 2017/0015270 A1 | 1/2017 | Ohno et al. | |
| 2017/0021794 A1 | 1/2017 | Sumiya et al. | |
| 2017/0028954 A1 | 2/2017 | Sumiya | |
| 2017/0028956 A1 | 2/2017 | Ohno et al. | |
| 2017/0028960 A1 | 2/2017 | Kobayashi et al. | |
| 2017/0036639 A1 | 2/2017 | Yamada | |
| 2017/0217399 A1 | 8/2017 | Patel et al. | |
| 2018/0015902 A1* | 1/2018 | Maenishi | B60R 21/205 |
| 2018/0208143 A1* | 7/2018 | Fischer | B60R 21/205 |
| 2018/0370472 A1* | 12/2018 | Belwafa | B60R 21/0136 |
| 2019/0111882 A1* | 4/2019 | Kim | B60R 21/205 |

* cited by examiner

CENTRAL PASSENGER AIR BAG

RELATED APPLICATION

This application claims the benefit of U.S. Provisional Application No. 62/465,187, which was filed on 1 Mar. 2017.

BACKGROUND

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated condition. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated condition. The air bag cover opens as a result of forces exerted on the cover by the inflating driver air bag.

Referring to FIG. 1, a known vehicle occupant protection system 200 can include a steering wheel mounted driver frontal air bag 202 and an instrument panel mounted passenger frontal air bag 204. When the vehicle 206 is involved in oblique or small overlap crashes, the passenger side occupant, whose head is indicated generally at 208, tends to move toward the passenger frontal air bag 204 at an angle, indicated generally by the arrow 210. When the occupant's head engages the air bag 204, as shown at 208', the head can tend to roll off inboard, as indicated generally by the arrow 212, thus incurring a significant amount of head rotation, which can be detrimental.

SUMMARY

A vehicle occupant safety system helps protect front seat occupants of a vehicle in the event of a collision that results in oblique forward occupant movement. According to one aspect, the safety system includes a frontal air bag inflatable between an instrument panel and the front seat vehicle occupant, and a central air bag inflatable adjacent and inboard of the frontal air bag. The frontal air bag can be configured and positioned to receive and cushion the vehicle occupant moving in an oblique direction in the vehicle as the result of a vehicle collision. The central air bag can be configured and positioned to support an inboard portion of the frontal airbag against flattening cut in response to receiving the obliquely moving occupant, and to engage the obliquely moving occupant's head and resist rotation of the vehicle occupant's head resulting from moving obliquely into engagement with the frontal air bag.

According to another aspect, alone or in combination with any other aspect, the central air bag can also configured to receive and absorb impact energy of the obliquely moving occupant.

According to another aspect, alone or in combination with any other aspect, the central air bag can be configured to deploy in a direction that is rearward and outboard in the vehicle so as to engage and support the frontal air bag.

According to another aspect, alone or in combination with any other aspect, the central air bag can be configured to extend rearward of the frontal air bag so that, as the obliquely moving occupant penetrates the frontal air bag. Portions of the frontal air bag displaced by the penetrating occupant can cause the central air bag to arc around the side of the obliquely moving occupant's head to provide support for the head that acts against rotation.

According to another aspect, alone or in combination with any other aspect, the central air bag when engaging the frontal air bag can provide inboard support for the frontal air bag that resists collapse of the frontal air bag in response to receiving the obliquely moving occupant.

According to another aspect, alone or in combination with any other aspect, in response to inboard support being overcome and the frontal air bag collapsing in response to receiving the obliquely moving occupant's bead, the central air bag can be configured to arc toward the back of the occupant's head and counteract the tendency for the occupant's head to rotate.

According to another aspect, alone or in combination with any other aspect, the central air bag can be a pillow shaped bag having an elongated configuration with a longitudinal axis that extends obliquely relative to the longitudinal vehicle axis in a direction that is rearward and outboard of the vehicle.

According to another aspect, alone or in combination with any other aspect, the central air bag can help support the occupant's head against rolling as a result of moving obliquely into engagement with the frontal air bag.

According to another aspect, alone or in combination with any other aspect, the frontal air bag can be an instrument panel mounted passenger frontal air bag and the central air bag is mounted to the instrument panel inboard of the frontal air bag. The central air being can be configured to deploy rearward and outboard toward the passenger side of the vehicle into engagement with the passenger frontal air bag.

According to another aspect, alone or in combination with any other aspect, the safety system can include a steering wheel mounted driver frontal air bag. The central air bag can also be configured to have a portion inflatable adjacent an inboard portion of the driver frontal air bag to receive and cushion driver side occupant moving obliquely inboard as the result of a vehicle collision.

According, to another aspect, alone or in combination with any other aspect, the central air bag can be configured to engage the driver frontal air bag.

According to another aspect, alone or in combination with any other aspect, the central air bag can be configured to reach at least one of the instrument panel and a vehicle steering column.

According to another aspect, alone or in combination with any other aspect, the central air bag can be configured to extend into contact with the passenger frontal air bag so that the passenger frontal air bag serves as a reaction surface for the central air bag when receiving a driver side occupant moving obliquely inboard into engagement with the central air bag.

According to another aspect, alone or in combination with any other aspect, the central air bag can be configured to extend into contact with the instrument panel so that the instrument panel serves as a reaction surface for the central air bag when receiving a driver side occupant moving obliquely inboard into engagement with the central air bag.

According to another aspect, alone or in combination with any other aspect, the central air bag can be configured to be mounted to the instrument panel, the steering column, or to other vehicle structure in the vicinity of the instrument panel.

According to another aspect, the safety system can include a passenger frontal air bag inflatable between an instrument panel and the front seat passenger side vehicle occupant, and a central air bag positioned inboard of the passenger frontal air bag and inflatable rearward and outboard in the vehicle into engagement with the passenger frontal air bag. The central air bag can support an inboard portion of the passenger frontal air bag, using the instrument panel as a reaction surface, against flattening out in response to receiving an obliquely moving occupant.

According to another aspect, alone or in combination with any other aspect, the central air bag can engage the obliquely moving occupant's head and resists rotation of the vehicle occupant's head resulting from moving obliquely into engagement with the frontal air bag.

According to another aspect, alone or in combination with any other aspect, the central air bag can be configured to extend rearward of the passenger frontal air bag so that, as the obliquely moving occupant penetrates the passenger frontal air bag, portions of the frontal air bag displaced by the penetrating occupant cause the central air bag to arc around the side of the obliquely moving occupant's head to provide support for the head that acts against rotation.

According to another aspect, alone or in combination with any other aspect, the central air bag can be a pillow shaped bag having an elongated configuration with a longitudinal axis that extends rearward and outboard of the vehicle.

According to another aspect, alone or in combination with any other aspect, the safety system can also include a steering wheel mounted driver frontal air bag. The central air bag can also be configured to have a portion inflatable adjacent an inboard portion of the driver frontal air bag to receive and cushion driver side occupant moving obliquely inboard as the result of a vehicle collision.

According to another aspect, alone or in combination with any other aspect, the central air bag can be configured to engage the driver frontal air bag.

According to another aspect, alone or in combination with any other aspect, the central air bag can be is configured to extend into contact with the passenger frontal air bag so that the passenger frontal air bag serves as a reaction surface for the central air bag when receiving a driver side occupant moving obliquely inboard into engagement with the central air bag.

According to another aspect, the safety system can include a driver frontal air bag inflatable from a vehicle steering wheel between an instrument panel of the vehicle and a driver side front seat occupant of the vehicle. The safety system can also include a passenger frontal air bag inflatable from the instrument panel between the instrument panel and a passenger side front seat occupant of the vehicle. The safety system can also include a central air bag positioned between the driver frontal air bag and passenger frontal air bag and being inflatable away from the instrument panel rearward and outboard toward the passenger side of the vehicle. The central air bag when inflated can engage the passenger frontal air bag and having portions adjacent or engaging the driver frontal air bag.

DRAWINGS

DESCRIPTION

Figure 2:
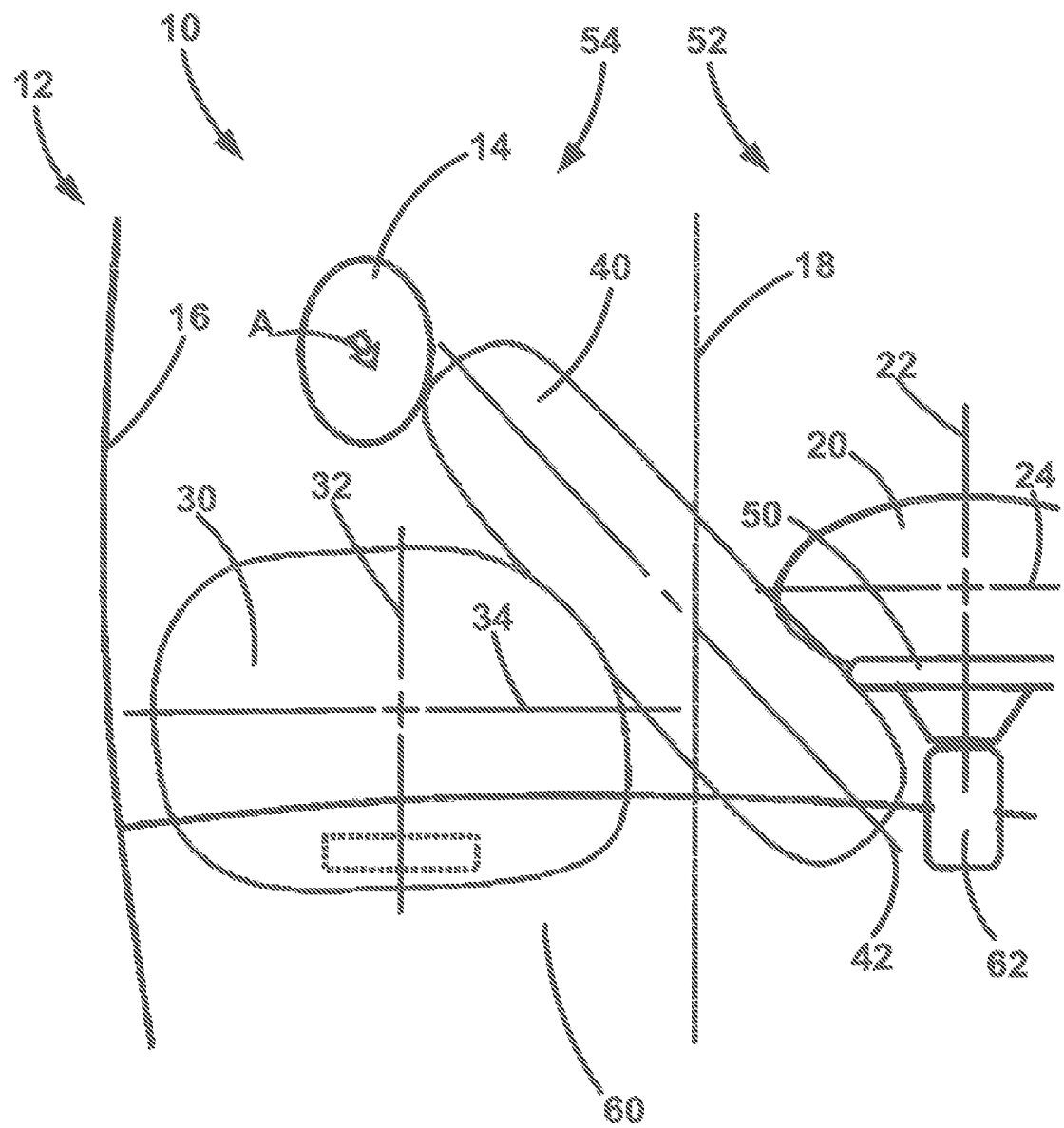
FIG. 2 is a schematic illustration depicting a vehicle occupant protection system including a central airbag in a first condition.

Referring to FIG. 2, a system 10 for helping to protect one or more occupants 14 of driver side 52 or passenger side 54 of a vehicle 12 includes inflatable vehicle occupant protection devices in the form of air bags. The air bags include a steering wheel mounted driver frontal air bag 20, an instrument panel mounted passenger frontal air bag 30, and an instrument panel mounted central air bag 40. Each of these air bags 20, 30, 40 can be part of an air bag module that includes an inflator and a housing. Each air bag 20, 30, 40 has a stored condition in which the air bag is folded and placed in the housing. The module including the driver air bag 20 is mounted to the steering wheel 50. The modules including the passenger air bag 30 and the central air bag 40 are mounted to or within the dash or instrument panel 60 of the vehicle 12.

The inflators associated with the air bags 20, 30, 40 are actuatable to provide inflation fluid to an inflatable volume of the air bag to deploy the air bag to the inflated condition. The inflator may be of any known type, such as stored gas, solid propellant, augmented, or hybrid. The system 10 includes one or more sensors for sensing an event for which inflation of the air bag is desired, such as a collision, and a controller for controlling operation of the inflators. The inflators are operatively connected to the controller via lead wires.

The air bags 20, 30, 40 can be constructed of any suitable material, such as nylon (e.g., woven nylon 6-6 yarns), and may be constructed in any suitable manner. For example, the air bag may include one or more pieces or panels of material. If more than one piece or panel is used, the pieces or panels may be interconnected by known means, such as stitching, ultrasonic welding, heat bonding, or adhesives, to form the air bag. The air bag may be uncoated, coated with a material, such as a gas impermeable urethane, or laminated with a material, such as a gas impermeable film. The air bag thus may have a gas-tight or substantially gas-tight construction. Those skilled in the art will appreciate that alternative materials, such as polyester yarn, and alternatives coatings, such as silicone, may also be used to construct the air bag.

Upon sensing the occurrence of an event for which inflation of the air bag is desired, such as a vehicle collision, the controller provides signals to the inflators via the lead wires. Upon receiving the signals from the controller, the inflators are actuated and provide inflation fluid to the inflatable volume of the air bags 20, 30, 40 in a known manner. The inflating air bags exert a force on their module closures (e.g., housings/doors) which places the modules in an opened condition. The air bags 20, 30, 40 inflate from their respective housings to the deployed conditions indicated generally in FIG. 2. The air bags 20, 30, 40, while inflated, help protect the vehicle occupant from impacts with parts of the vehicle, such as the instrument panel 60 and/or steering wheel 50.

The air bags 20, 30, 40, when deployed in response to an event for which occupant protection is desired, help protect the occupant by helping to absorb the force of impacts placed on the air bag by the occupants.

Figure 1:
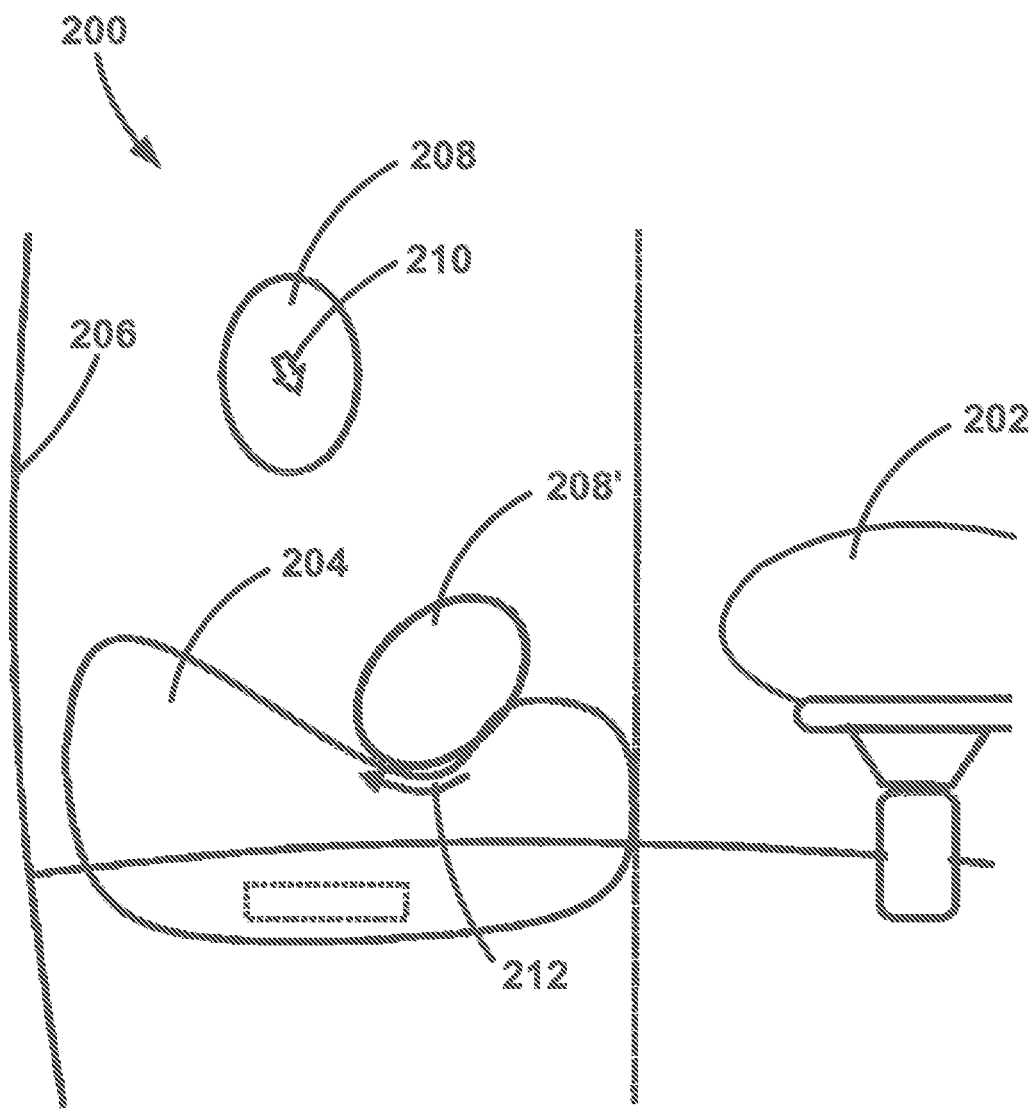
FIG. 1 is a schematic illustration depicting a known vehicle occupant protection system.
Figure 3:
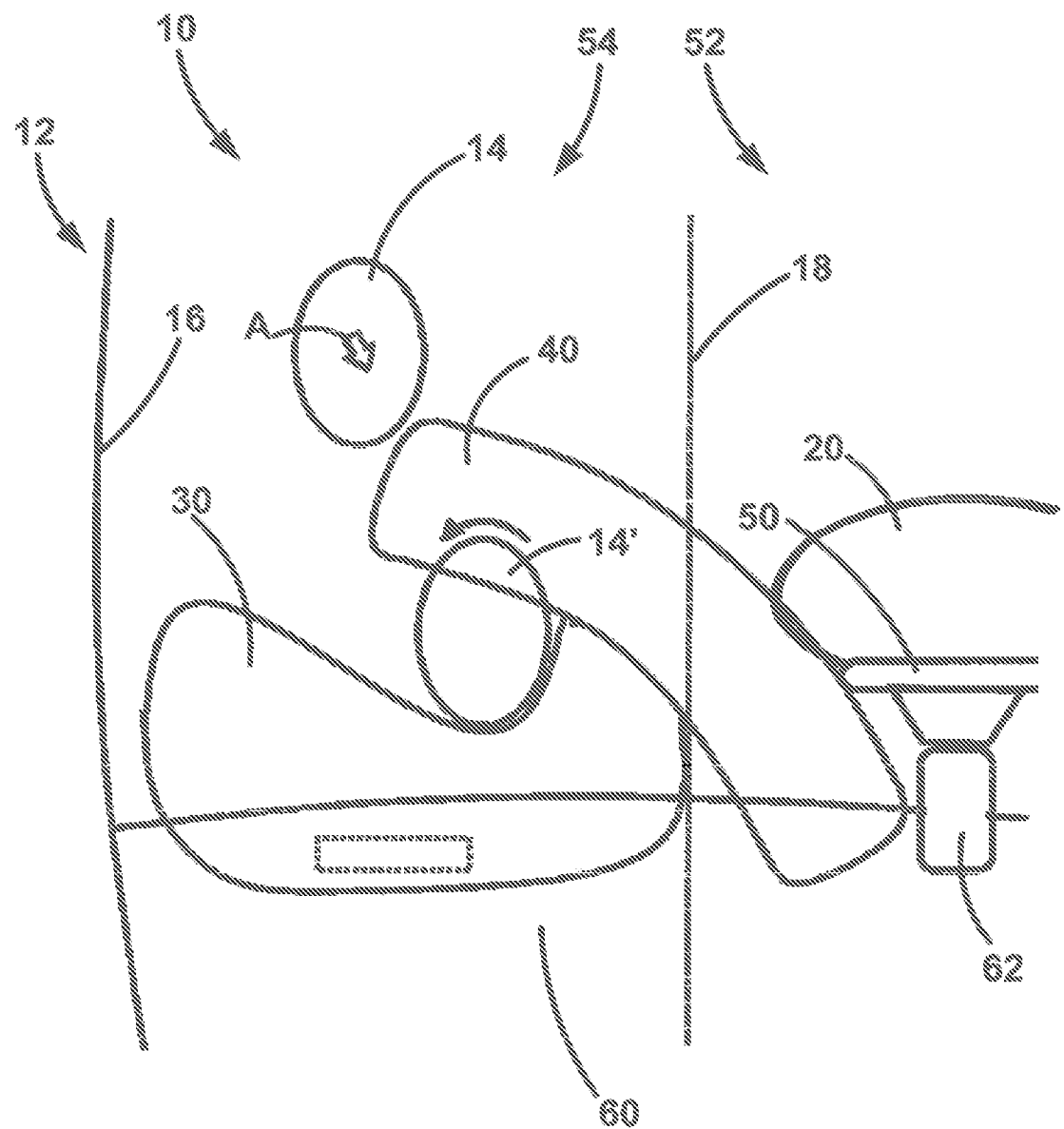
FIG. 3 is a schematic illustration depicting a vehicle occupant protection system including a central airbag in a second condition.

In certain vehicle crash events, such as oblique or small overlap crashes, occupants 14 can move in the vehicle 12 in a forward direction, indicated generally by arrow A in FIGS. 2 and 3, that is oblique with respect to the vehicle. By "oblique" with respect to the vehicle 12, it is meant that the occupant moves forward in a direction that is neither parallel nor perpendicular to the longitudinal axis 18 of the vehicle. Because the driver and passenger frontal air bags 20, 30 are arranged with their respective central axes 22, 32 parallel to the vehicle axis 18, and their respective lateral axes 24, 34 perpendicular to their central axes and the vehicle axis, this occupant movement is also oblique to the respective air bag axes for each occupant. Left unchecked, this oblique movement can result in the occupant's head rolling and incurring a significant amount of head rotation (see FIG. 1, described above).

Referring to FIGS. 2 and 3, according to one aspect, the central air bag 40 helps support the occupants head against rolling as a result of moving obliquely into engagement with the frontal air bag 30. The central air bag 40 is a pillow shaped bag (PSB) having an elongated configuration with a longitudinal axis 42 that extends obliquely relative to the vehicle axis 18 in a direction that is rearward and outboard to the passenger side 54 of the vehicle 12. The central air bag 40 can be mounted to the instrument panel 60, the steering column 62, or to other vehicle structure in the vicinity of the instrument panel.

The central air bag 40 serves two primary purposes: to support the passenger to reduce head twisting loads, and to support the driver by providing a cushion to minimize head to instrument panel contact.

To help reduce head twisting loads, the central air bag 40 can engage the inboard portion of the passenger frontal air bag 30 and can help serve as a central support for the passenger frontal air bag. As the occupant 14 penetrates the frontal air bag 30, portions of the frontal air bag displaced by the penetrating occupant cause the central air bag 40 to arc around the side of the head 14 to provide support for the head that acts against rotation.

In the small overlap/oblique crash scenario, the occupant 14 moves in the direction A toward the inboard portion of the air bag 30. Since there is no lateral reaction surface against which the air bag 30 can rest, the air bag tends to flatten out, allowing the volume of the air bag to shift outboard in the vehicle. As shown in FIG. 3, this results in a greater bag volume on the outboard side of the occupant 14 and a lesser volume on the inboard side of the occupant. This causes the forces acting on the occupant 14 to be greater on the outboard side of the head and lesser on the inboard side of the head. This imbalance causes the head 14 to rotate or roll in the inboard direction (see FIG. 1) and can even cause the head to roll off of the air bag.

The central air bag 40 provides support to the side of the frontal air bag 30. In the case shown, it is on the inboard side. The added pillow provides added support without adding a significant amount of volume. It acts like a kickstand on a bike to prevent the bag from collapsing over. As shown in FIG. 3, as the occupant 14 penetrates the bag, the inboard portion of the bag collapses and the central air bag 40 arcs toward the back of the occupant's head to counteract the tendency to rotate.

Figure 4:
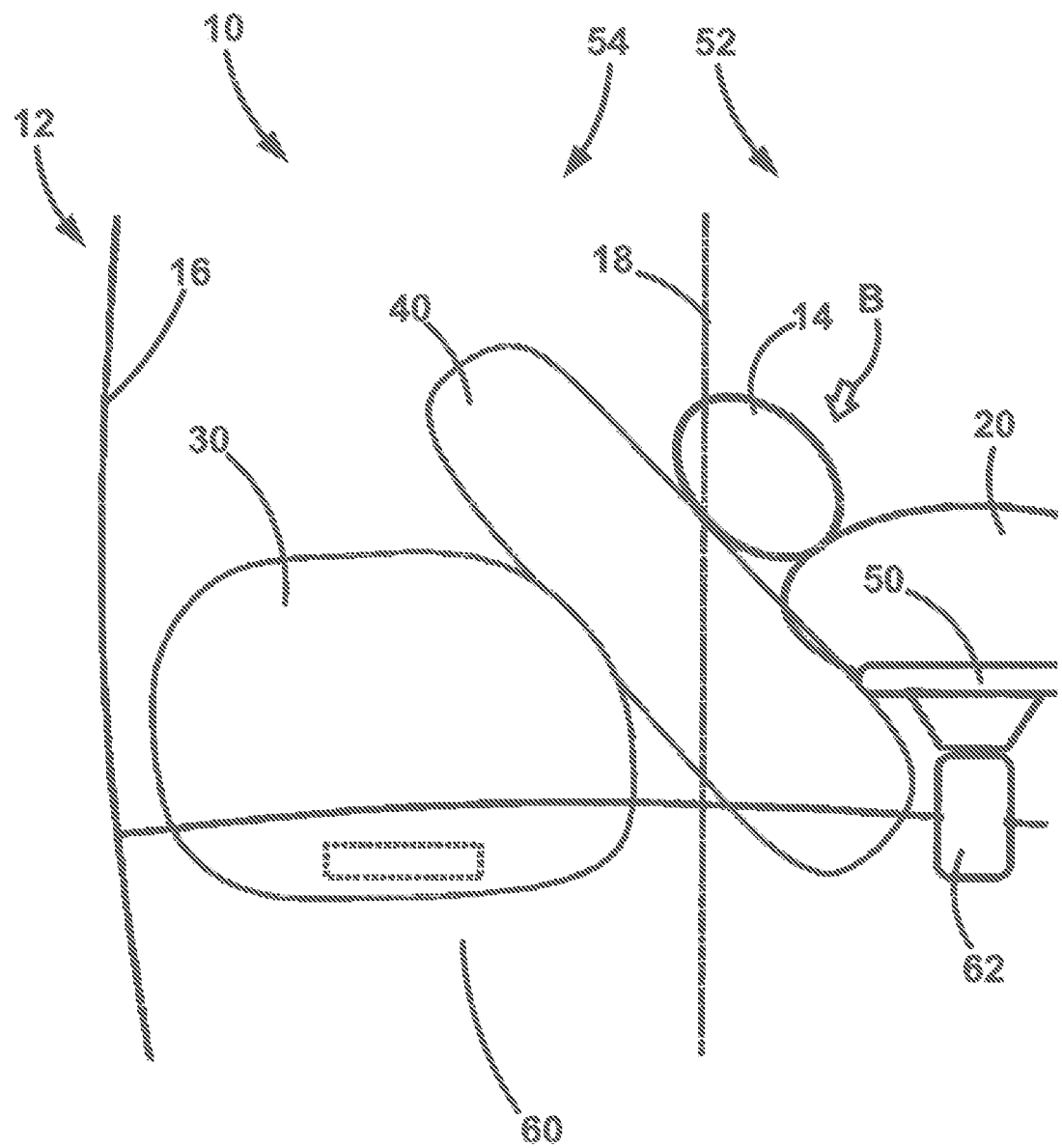
FIG. 4 is a schematic illustration depleting a vehicle occupant protection system including a central airbag in a third condition.

As an added feature, as shown in FIG. 4, the central air bag 40 can be long enough to reach the instrument panel 60 and/or steering column 82 and to provide support to the central air bag 40 for helping to restrain the driver occupant 14. When the occupant 14 moves obliquely (arrow B) toward the steering wheel mounted driver air bag 20 and central air bag 40, the central air bag can help limit, reduce, or block inboard head rotation. Also, the driver frontal air bag 30, having the steering wheel as a reaction surface, and the central air bag 40, having the instrument panel 60, steering column 82, and the passenger frontal air bag 30 as a reaction surface or support, can help absorb impact forces of the penetrating occupant 14.

Those skilled in the art will appreciate that principles similar to those described above in relation to the central air bag 40 can be implemented to help account for crash scenarios where the occupant moves in an obliquely outboard direction (not shown). For this scenario, the vehicle safety system 10 can include an outboard air bag (not shown) similar to the central air bag 40, but placed outboard of the passenger frontal air bag 30 adjacent the side structure 16 of the vehicle 12. The outboard air bag can extend obliquely rearward and inboard in the vehicle, in a manner somewhat equal and opposite the central air bag. This outboard air bag can react with the frontal air bag 30 in the same or similar manner as the central air bag 40 to help block head rotation due to oblique occupant air bag penetration. Similar results can be obtained by placing an outboard air bag on the driver side of the vehicle.

We claim:

1. A vehicle occupant safety system for helping to protect front seat occupants of a vehicle in the event of a collision that results in oblique forward occupant movement, comprising:
  a frontal air bag inflatable between an instrument panel and the front seat vehicle occupant; and
  a central air bag inflatable adjacent and inboard of the frontal air bag;
  wherein the central air bag is a pillow shaped bag having an elongated configuration with a longitudinal axis that extends obliquely relative to the longitudinal vehicle axis in a direction that is rearward and outboard of the vehicle and toward the frontal air bag so that the central air bag engages the frontal air bag and extends rearward beyond the extent of the frontal air bag;
  wherein the frontal air bag is configured and positioned to receive and cushion the vehicle occupant moving in an oblique direction in the vehicle as the result of a vehicle collision, and
  wherein the central air bag is configured and positioned to support an inboard portion of the frontal air bag against flattening out in response to receiving the obliquely moving occupant, and to engage the obliquely moving occupant's head and resist rotation of the vehicle occupant's head resulting from moving obliquely into engagement with the frontal air bag.

2. The safety system recited in claim 1, wherein the central air bag is also configured to receive and absorb impact energy of the obliquely moving occupant.

3. The safety system recited in claim 1, wherein the central air bag is configured to deploy in a direction that is rearward and outboard in the vehicle so as to engage and support the frontal air bag.

4. The safety system recited in claim 1, wherein the central air bag is configured so that, as the obliquely moving occupant penetrates the frontal air bag, portions of the frontal air bag displaced by the penetrating occupant cause the central air bag to arc around the side of the obliquely moving occupant's head to provide support for the head that acts against rotation.

5. The safety system recited in claim 1, wherein the central air bag when engaging the frontal air bag provides inboard support for the frontal air bag that resists collapse of the frontal air bag in response to receiving the obliquely moving occupant.

6. The safety system recited in claim 5, wherein in response to inboard support being overcome and the frontal air bag collapsing in response to receiving the obliquely moving occupant's head, the central air bag is configured to arc toward the back of the occupant's head and counteract the tendency for the occupant's head to rotate.

7. The safety system recited in claim 1, wherein the central air bag is configured to help support the occupant's head against rolling as a result of moving obliquely into engagement with the frontal air bag.

8. The safety system recited in claim 1, wherein the frontal air bag is an instrument panel mounted passenger frontal air bag and the central air bag is mounted to the instrument panel inboard of the frontal air bag, the central air bag being configured to deploy rearward and outboard toward a passenger side of the vehicle into engagement with the passenger frontal air bag.

9. The safety system recited in claim 8, further comprising a steering wheel mounted driver frontal air bag, wherein the central air bag is also configured to have a portion inflatable adjacent an inboard portion of the driver frontal air bag to receive and cushion a driver side occupant moving obliquely inboard as the result of a vehicle collision.

10. The safety system recited in claim 9, wherein the central air bag is configured to engage the driver frontal air bag.

11. The safety system recited in claim 9, wherein the central air bag is configured to reach at least one of the instrument panel and a vehicle steering column.

12. The safety system recited in claim 9, wherein the central air bag is configured to extend into contact with the passenger frontal air bag so that the passenger frontal air bag serves as a reaction surface for the central air bag when receiving a driver side occupant moving obliquely inboard into engagement with the central air bag.

13. The safety system recited in claim 12, wherein the central air bag is configured to extend into contact with the instrument panel so that the instrument panel serves as a reaction surface for the central air bag when receiving a driver side occupant moving obliquely inboard into engagement with the central air bag.

14. The safety system recited in claim 1, wherein the central air bag is configured to be mounted to the instrument panel, the steering column, or to other vehicle structure in the vicinity of the instrument panel.

15. A vehicle occupant safety system for helping to protect front seat occupants of a vehicle in the event of a collision that results in oblique forward occupant movement, comprising:
  a passenger frontal air bag inflatable between an instrument panel and a front seat passenger side vehicle occupant; and
  a central air bag positioned inboard of the passenger frontal air bag and inflatable rearward and outboard in the vehicle into engagement with the passenger frontal air bag, the central air bag being pillow shaped and having a longitudinal axis extending rearward and outboard in the vehicle toward the passenger frontal air bag, the central air bag extending rearward beyond the extent of the passenger frontal air bag;
  wherein the central air bag supports an inboard portion of the passenger frontal air bag, using the instrument panel as a reaction surface, against flattening out in response to receiving an obliquely moving occupant.

16. The safety system recited in claim 15, wherein the central air bag is configured to engage the obliquely moving occupant's head and is configured to resist rotation of the vehicle occupant's head resulting from moving obliquely into engagement with the frontal air bag.

17. The safety system recited in claim 16, wherein the central air bag is configured so that, as the obliquely moving occupant penetrates the passenger frontal air bag, portions of the frontal air bag displaced by the penetrating occupant cause the central air bag to arc around the side of the obliquely moving occupant's head to provide support for the head that acts against rotation.

18. The safety system recited in claim 15, further comprising a steering wheel mounted driver frontal air bag, wherein the central air bag is also configured to have a portion inflatable adjacent an inboard portion of the driver frontal air bag to receive and cushion a driver side occupant moving obliquely inboard as the result of a vehicle collision.

19. The safety system recited in claim 18, wherein the central air bag is configured to engage the driver frontal air bag.

20. The safety system recited in claim 18, wherein the central air bag is configured to extend into contact with the passenger frontal air bag so that the passenger frontal air bag serves as a reaction surface for the central air bag when receiving a driver side occupant moving obliquely inboard into engagement with the central air bag.

* * * * *